June 21, 1966 A. E. VOGEL 3,257,122
STABILIZING DEVICE
Original Filed Feb. 24, 1959 2 Sheets-Sheet 2

INVENTOR.
ARTHUR E. VOGEL
BY Schmieding and Fultz
ATTORNEYS

United States Patent Office 3,257,122
Patented June 21, 1966

3,257,122
STABILIZING DEVICE
Arthur E. Vogel, Columbus, Ohio, assignor, by mesne assignments, of one-fourth to Palmer Fultz, one-fourth to Warren H. F. Schmieding, one-fourth to Arthur E. Vogel, all of Columbus, and one-fourth to Robert Dawson, Coshocton, Ohio
Continuation of application Ser. No. 823,795, Feb. 24, 1959. This application Dec. 10, 1962, Ser. No. 247,431
5 Claims. (Cl. 280—112)

This invention relates to stabilizing systems of a type which is particularly useful when applied to vehicles, such as automobiles, buses and trucks.

This application is a continuation of my co-pending application Serial No. 823,795, filed February 24, 1959, and now abandoned.

In particular, the present invention relates to an improvement in stabilizing systems for vehicles consisting of a novel fluid actuated cylinder construction and related apparatus. This invention is particularly useful when applied to a stabilizing system of the type described in my Patent No. 2,960,349 issued November 15, 1960.

The conventional motor vehicle is ordinarily provided with springs between the body and the wheels of the vehicle so that such springs will absorb shocks and jars of the vehicles to provide more comfortable riding for the occupant. When the vehicle is rounding curves, however, the springs at the wheels on the side of the vehicle nearest to the center of the curve push upward on such side of the vehicle due to the fact that energy is stored in such springs by the normal weight of the vehicle. Such upward spring force helps to disturb the stability or actually upset the vehicle when rounding a curve by augmenting the centrifugal force that is concurrently exerted on the vehicle due to the fact that the vehicle is undergoing a change in direction.

The vehicle stabilizing apparatus, disclosed in my application Serial No. 332,651, now Patent No. 2,960,349, eliminates a force detrimental to stability by decreasing the effect, on the body of the vehicle, or energy normally stored in the springs of the vehicle. Further advantages of such stabilizing apparatus include lowering of the center of gravity of the vehicle in curves, increased traction at desired wheels, and concurrent operation with conventional shock absorbers. All of these advantages are explained in detail in the above indicated application.

In rounding a curve with a vehicle equipped with springs the side of the vehicle towards the center of the curve tends to raise due to certain forces exerted on the vehicles. One of such forces is the centrifugal force which can be considered as being exerted at the center of gravity of the vehicle. Frictional force is exerted on the wheels by the road, with such force acting in a direction opposite to that of centrifugal force. Since centrifugal force acts above and in opposition to such frictional force, the two forces comprise a couple which tends to roll the vehicle about its longitudinal axis and which actually raises the side of the vehicle nearest the center of the curve. The intensity of the centrifugal force varies directly with the mass and the square of velocity of the vehicle and inversely with the radius of the curve about which the vehicle is traveling. Hence it may be seen that the only way a driver can lessen centrifugal force is by decreasing velocity or increasing the radius of turn.

Another force which is of major detriment to stability is the force in the normally compressed spring which pushes upwardly at the side of the vehicle nearest the center of the curve. Such upwardly exerted spring force serves to augment centrifugal force in disturbing the stability of a vehicle when negotiating a curve.

The present stabilizing apparatus achieves roadability by decreasing the effect of the upwardly exerted spring force at the side of the vehicle nearest the center of the curve which the vehicle is rounding. This spring force, which normally acts adversely in curves, is of considerable magnitude. In conventional vehicles, such force is in excess of a thousand pounds at each wheel. To overcome the detrimental effect due to the adverse spring force, the present novel fluid actuated cylinder is provided to efficiently confine or compress, or release only a limited amount of the spring energy normally exerted on the body of a vehicle at the side thereof nearest the center of the curve which such vehicle is rounding.

It is an object of the present invention to provide, for a stabilizing apparatus of the type described, a combined vehicle suspension spring and fluid actuated cylinder which may be operatively mounted between the sprung and unsprung weight of a vehicle.

It is an object of the present invention to provide, for a stabilizing apparatus of the type described, a combined vehicle suspension spring and fluid actuated cylinder which may be operatively mounted between the sprung and unsprung weight of a vehicle to decrease, when actuated, the effect of the spring energy on the vehicle body, and which serves to maintain limited spring effcet, between the sprung and unsprung weight, when in an actuated condition by a compressible fluid.

It is an object of the present invention to provide, for a stabilizing apparatus of the type described, an improved fluid actuated cylinder consisting of a resilient member combined with a flexible covering to form a sealed chamber and means for translating fluid into and out of said chamber.

It is an object of the present invention to provide, for a stabilizing apparatus of the type described, an improved fluid actuated cylinder consisting of the utilization of the conventional coil spring of a vehicle in combination with a flexible covering to form a sealed chamber and means for translating fluid into and out of said chamber.

It is an object of the present invention to provide for a stabilizing apparatus of the type described, an improved fluid actuated cylinder which can be readily installed between the sprung and unsprung weight of a vehicle and operativley retained in mounted relationship between the conventional spring retainers of the vehicle.

It is an object of the present invention to provide, for a stabilizing apparatus of the type described, an improved fluid actuated cylinder which, when the cylinder is operatively applied between the sprung and unsprung weight of a vehicle, eliminates the need for special mounting means for the cylinder, and which further eliminates the need for special force transmitting structure from the cylinder to the sprung and unsprung weight.

It is an object of the present invention to provide for a stabilizing apparatus of the type described, an improved fluid actuated cylinder which can be inexpensively formed utilizing elements conventionally available on the vehicle, and which can be readily installed on a vehicle with a minimum of work.

It is still another object of the present invention to provide, for stabilizing apparatus of the type described, an improved control system which includes a sensitivity governor for varying the sensitivity of a control system to a force encountered by the vehicle responsive to variations in the speed of the vehicle.

Further objects and advantages of the present invention will be apparent from the following description, reference being had to the accompanying drawings wherein a preferred form of embodiment of the present invention is clearly shown.

Figure 4:
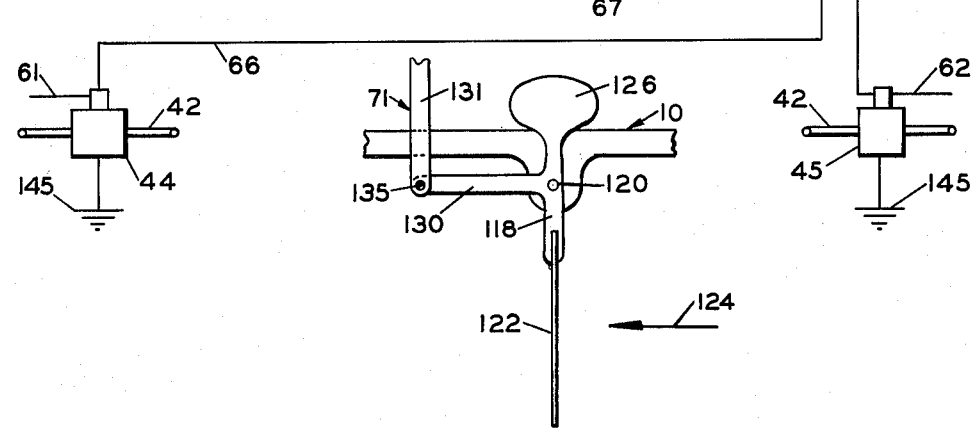

In FIG. 4 sensitivity governor 71 is being viewed from the left side of the vehicle with the front surface of air paddle 122 facing air stream 124.

Figure 1:
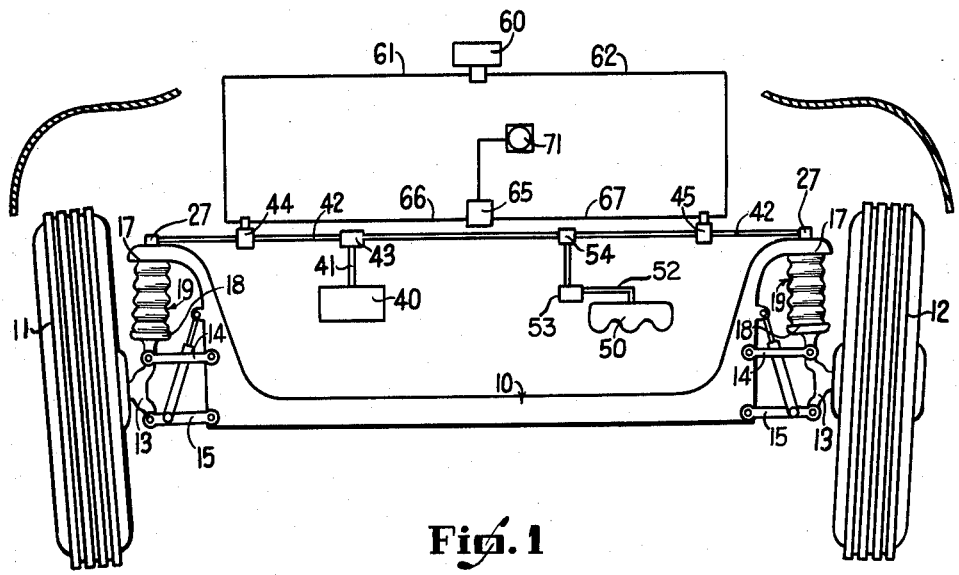
FIG. 1 is a diagrammatic view showing the application of my invention to a motor vehicle wherein such invention is operatively adapted to the front wheel of the vehicle.

Referring to the drawings, and more particularly to FIG. 1, a main body member or frame of a vehicle is indicated generally at 10. FIG. 1 is a view, partially diagrammatic, of the present invention with the wheels and frame appearing essentially as seen from the front of the vehicle. A right front wheel 11 and a left front wheel 12 are provided for the frame or body member 10. Each of such wheels is rotatably mounted on an axle member 13. Two upper links 14 are provided so each pivotally engages the frame and an axle member. In a corresponding manner, two lower links 15 are provided and each pivotally engages the frame and an axle member. The links 14 and 15 serve to mount the wheels to the frame in a manner such that each wheel is free to move essentially vertically relative to such frame. A recess 18 is formed in the top of each axle means 13 and a similar recess 17 is provided in each side of the frame member 10. A combined spring and fluid actuated cylinder 19 for the right front wheel is retained between the recesses 17 and 18. In a like manner, an identical combined spring and fluid actuated cylinder is retained at the left front wheel. With the spring cylinder 19 mounted in the manner shown, it will be seen that such spring cylinders operatively connect the frame 10 with the respective front wheels 11 and 12.

Figure 2:
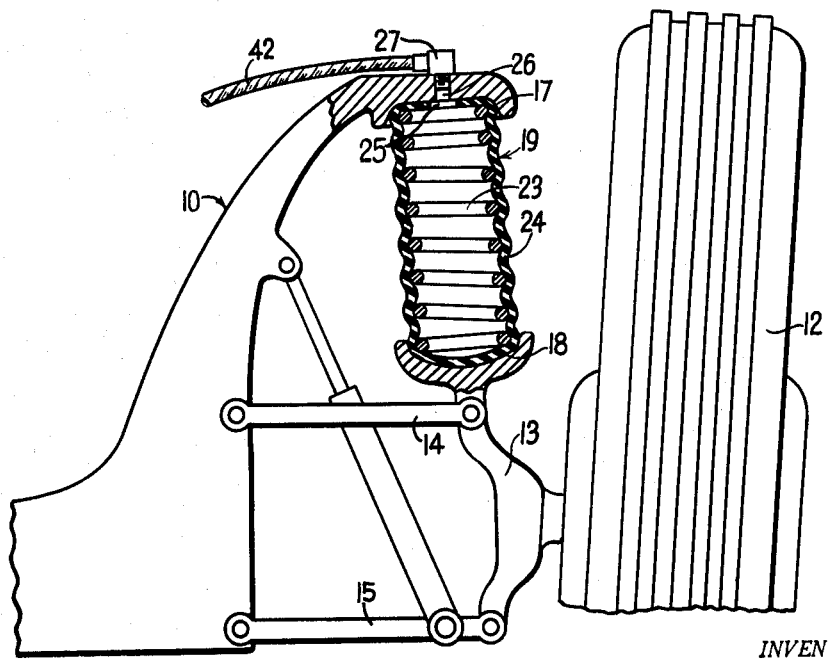
FIG. 2 is a sectional view of a fluid actuated cylinder constructed according to the present invention, together with mechanism associated therewith, with the section being taken substantially along a vertical plane passing through the center of the fluid actuated cylinder.

Referring particularly to FIG. 2, the interior of one of the spring cylinders 19 is shown in detail. It will be understood that the other spring cylinder includes identical interior structure. As seen in FIG. 2, the spring cylinder includes a coil spring 23 and a flexible casing 24 which casing may be formed of synthetic rubber or other suitable material. The upper end of the flexible casing 24 is provided with an opening 25 which registers with a hole 26 which is formed through frame member 10. A fitting 27 is threaded into the upper opening of hole 26 for the purpose of connecting a fluid line 42 with the interior of spring cylinder 19. Hence it is seen that fluid can be translated to and from the spring cylinder 19 by suitable means later to be described.

At this point in the description, it will be understood that by controlling the amount of fluid in the spring cylinder 19 this apparatus can be adapted to completely compress spring 23, or partially compress such spring any predetermined amount beyond its normal load, partially compressed, configuration. The apparatus can likewise be adapted to confine the spring at its normal load configuration, or permit limited expansion of the spring any predetermined amount. It should presently be mentioned that the compressing confining, or releasing of the spring can be effected at a selected spring, and when the vehicle is rounding a curve, by suitable control mechanism later to be described.

As a means for actuating the spring cylinders 19 a vacuum source, in the form of a tank 40, may be utilized. It has been found that it is convenient to position the tank 40 in the upper part of the baggage trunk of the vehicle so that such tank will not take up useful space. A line 41 leads from the vacuum tank and joins a line 42 at the T-connection 43, as seen in FIG. 1. This line 42 extends through the valve 44 and connects with the right spring cylinder. Line 42 similarly extends in the other direction through the valve 45 to the left spring cylinder. In this manner, the two spring cylinders are connected to the source of vacuum and the valves 44 and 45 are properly located to selectively control the connecting and disconnecting of the respective spring cylinders with the source of vacuum. When either of the spring cylinders 19 is not in communication with the source of vacuum 40 the valves 44 or 45 serve to place the interiors of such spring cylinders in communication with the atmosphere.

To maintain a constant source of vacuum, I prefer to utilize the engine intake manifold, which is a source of low pressure ordinarily present on a motor vehicle. An engine manifold is shown diagrammatically at 50 of FIG. 1. A line 52 extends through a check valve 53 and then to the line 42 at the T-connection 54. The check valve 53 is of a conventional type which is normally closed but which is adapted to open against line pressure. This valve 53, which allows unidirectional flow only, will open whenever the pressure in the vacuum tank becomes greater than the pressure at the intake manifold 50, and when such valve 53 opens, air will be drawn out of the vacuum tank towards the source of lower pressure at the intake manifold. In this manner the pressure in the vacuum tank 40 is continually and automatically maintained at a desired low level. As has been previously stated, actuation of the right spring cylinder is controlled by opening and closing the valve 44, and likewise, actuation of the left spring cylinder is accomplished by opening and closing the valve 45. For this purpose, I prefer to use solenoid operated valves, so that a driver of a vehicle can selectively operate either the valve 44 or the valve 45 by manual actuation of the manual anticipator 60. This anticipator 60 is essentially a three-way switch with a right, a left, and a neutral position. The electrical connection between the manual anticipator 60 and the valve 44 is provided by the wire 61. A similar connection leads to the valve 45 in the form of a wire 62.

To automatically and selectively open the valves 44 and 45, a detector unit 65 is shown connected to the valves 44 and 45, by the lines 66 and 67, respectively. This detector unit 65 utilizes mercury switches, in the preferred embodiment, so that when the vehicle is rounding a curve centrifugal force will operate on the mercury and cause it to make the electrical contact necessary to energize the proper solenoid valve. Therefore, if the vehicle is curving to the right and it is desirable to confine energy stored in the spring of the right spring cylinder, the detector unit 65 will respond to the action of centrifugal force exerted thereon, and energize the solenoid of valve 44 and thereby open such valve so the right spring cylinder will be actuated by vacuum. Similarly, when the vehicle is curving to the left, the detector unit 65 will energize the solenoid valve 45 and thereby actuate the left spring cylinder to confine the energy stored in the spring at the left side of the vehicle. Although I prefer to make the detector unit 65 of the mercury switch type, various other apparatuses which are responsive to the action of centrifugal force can be used.

Figure 3:
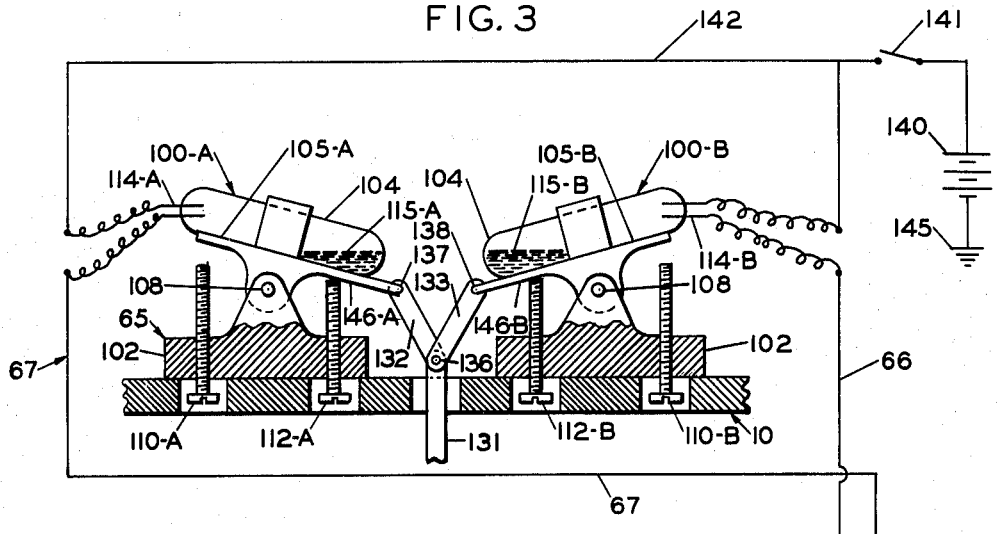
FIG. 3 is a front elevational view of a detector unit.

Reference is next made to FIGS. 3 and 4 which illustrate in detail, a combined detector unit 65 and sensitivity governor 71 comprising a portion of the control apparatus of FIG. 1.

The apparatus includes an inertia responsive switch means including a first mercury switch indicated generally at 100-A and a second mercury switch indicated generally at 100-B. Each of the mercury switches includes a base 102 mounted on the sprung weight 10 of the vehicle. To provide ready accessibility the mercury switches are preferably mounted under the hood of the vehicle and in front of the top portion of the radiator.

With continued reference to FIG. 3 each of the mercury switches 100–A and 100–B includes a pivotally mounted capsule 104 the bottoms of which form two inclined surfaces 105–A and 105–B. Pivot pins 108 serve to mount capsules 104 on bases 102.

Threaded elements 110–A, 110–B, 112–A, and 112–B are carried in threaded holes in bases 102 and form adjustable stops for limiting the degree of tilting of capsules 104 above their pivots 108. A pair of contacts 114–A are bridged when a quantity of mercury 115–A moves up inclined surface 105–A. Similarly a second pair of contacts 114–B are bridged when a quantity of mercury 115–B moves up the inclined surface 105–B.

The angles of inclination of inclined surfaces 105–A and 105–B are varied automatically responsive to variations in the speed of the vehicle by a sensitivity governor indicated generally at 71. Governor 71 includes a lever 118 pivotally mounted to the sprung weight 10 at a pivot 120. With reference to FIG. 4 the lower end of lever 118 carries an air paddle 122 which is disposed in an air stream indicated by arrow 124. The air stream in which paddle 122 is disposed may be an air stream created by the movement of the car or it may be the air stream created by the cooling fan for the engine.

The upper end of pivoted lever 118 carries a weight 126 which forms an inertia balance for the air paddle 122.

As seen in FIG. 4 movement of air paddle 122, and hence lever 118, is transmitted to the capsules 104 by arm 130 and links 131, 132, and 133 joined together by pivot pins 135 and 136. Links 132 and 133 are connected to inclined surfaces 105–A and 105–B at the pivot pins 137 and 138.

Reference is again made to FIGS. 3 and 4 for the purpose of describing the operation of the detector unit 65 and sensitivity governor 71 comprising a portion of the control system of the present invention.

As viewed in FIG. 3 the detector unit 65 is being viewed from the front of the vehicle with the mercury switch 105–A having its longitudinal axis inclined towards the right of the vehicle and the mercury switch 100–B having its longitudinal axis inclined towards the left side of the vehicle, said right side of the vehicle being on the right hand side of the driver as he sits at the steering wheel.

When the vehicle is turned to the right the quantity of mercury 115–B will move up the inclined surface 105–B and bridge contacts 114–B. This activates valve 44, on the right side of the vehicle via battery 140, on-off manually operated switch 141, wire 142, contacts 114–B, wires 66, and valve 44 to ground 145. When valve 44 is actuated right confining means 19 will be actuated in the manner previously described.

When a vehicle enters a curve to the left centrifugal force will cause the quantity of mercury 115–A to move up inclined surface 105–A and bridge contacts 114–A. This energizes left valve means 45 via battery 140, switch 141, wire 142, wire 67, valve means 45, and ground 145. When valve 45 is energized the left spring cylinder is actuated in the manner previously described.

When the vehicle is at rest, or moving at a slow speed, air paddle 122 will be disposed in the vehicle configuration shown in FIG. 4 and pivoted bases 146–A and 146–B will be at their greatest angles of inclination wherein the bases rest on the adjustable stops 112–A and 112–B as seen in FIG. 3. With the higher angles of inclination of inclined surfaces 105–A and 105–B the mercury will not readily move up the inclined surfaces and bridge the contacts even when the vehicle negotiates a corner. Hence the spring cylinders 19 will not be actuated at slow vehicle velocities under which condition their stabilizing effect is not required. Moreover, when the vehicle is pulling in and out of a driveway or encountering situations where the quantity of mercury 115–A and 115–B are subjected to shifting and bumping, the quantities of mercury will remain in the lower ends of the capsules 104 and will not needlessly make and break circuit at the contacts 114–A and 114–B. This prevents the occupant of the vehicle from experiencing unpleasant tilting or oscillating of the vehicle as would be the case if the mercury switches 100–A and 100–B were always disposed in a sensitive configuration.

At greater vehicle speeds, it is highly desirable to have mercury switches 100–A and 100–B disposed in a highly sensitive configuration so that contacts 114–A or 114–B will be instantly bridged under centrifugal force of low magnitude, at the instant the vehicle starts to corner. Such sensitive and rapid action of the mercury switch serves to apply the stabilizing effect at the spring cylinder 19 before the vehicle has started to tilt. Hence it is not necessary for the spring cylinders to return to level an already tilted vehicle whereby uncomfortable transition sensations, at curve entry, are prevented. Moreover, it has been discovered that when the stabilizing force is rapidly applied at the spring cylinders 19, before the vehicle has actually become tilted, a much smaller stabilizing force need be exerted at the spring means in order to maintain the vehicle level.

In view of the above, it will be understood that as the speed of the vehicle increases the force exerted by air stream 124 on air paddle 122 will increase whereby the angles of inclination of inclined surfaces 105–A and 105B are decreased, with a minimum angle of inclination being reached when the outer ends of pivoted bases 146–A and 146–B engage the adjustable stops 110–A and 110–B, respectively. In view of the above description it will be understood that the higher the vehicle speed the greater will be the sensitivity of mercury switches 100–A and 100–B. This is a most desirable feature since the greater the vehicle speed, the greater will be the centrifugal force encountered for any given radius of turn. Hence it becomes apparent that the greater the vehicle speed the more important it becomes to rapidly institute a stabilizing correction so that the higher centrifugal forces can be controlled with a minimum of stabilizing force exerted at the spring cylinder 19.

It should be pointed out that the detector unit 65 and sensitivity governor 71 can be adapted to apply anti-pitch corrections to a vehicle, such as the elimination of nose-dive under ordinary occurrences when the brake is applied. In stabilizing the vehicle against pitching the longitudinal axes of the mercury switches 100–A and 100–B would be aligned with the longitudinal axis of the vehicle with one of the mercury switches being adapted to energize spring cylinder 19 at the front wheels of the vehicle and the other of the mercury switches being adapted to energize spring cylinders 19 at the rear wheels of the vehicle.

It should further be pointed out that although the valves 44 and 45 are shown installed in a vacuum system, FIG. 1, the valves 44 and 45 or a single valve means duplicating their function, can be used in connection with pressurized fluid actuated stabilizing systems without departing from the aspect of the present invention wherein a detector unit 65 and sensitivity governor 71 are utilized to vary the sensitivity of a stabilizing apparatus to a force encountered by a vehicle responsive to variations in the vehicle speed.

In summary, it will be seen that the present invention provides, in a stabilizing apparatus of the type described, a combined vehicle suspension spring and fluid actuated cylinder which is inexpensive to produce and which may be readily applied to conventional suspension systems. The novel fluid actuated cylinder serves to maintain limited spring action, when in an actuated condition, and when a compressible fluid such as air is applied thereto. Hence resiliency between the sprung and unsprung weight of the vehicle can be maintained concurrently with the confinement of stored spring energy when the vehicle is negotiating a curve.

While the form of embodiment of the present invention as herein disclosed constitutes a referred form it is to be understood that other forms might be adopted, all coming with the scope of the claims which follow.

I claim:

1. The combination of a vehicle body having supporting wheels, a first resilient means operative at one side of the vehicle, a second resilient means operative at the other side of the vehicle, each of said resilient means including an integral flexible wall means forming a sealed chamber; control means for said resilient means including a first conduit means for a first fluid flow in communication with the interior of one of said sealed chambers; a second conduit means for a second fluid flow in communication with the interior of the other of said sealed chambers; a first electrically actuated valve means for controlling said first fluid flow; a second electrically actuated valve means for controlling said second fluid flow; and mercury switch means electrically connected to said valve means and including a first energized position wherein said first valve means is electrically energized, a second energized position wherein said second valve means is electrically energized, and a neutral position wherein said two valve means are deenergized, said mercury switch means including a mercury supporting surface inclined relative to the horizontal for causing mercury to be shifted from one level to a higher level by an inertia force encountered by said vehicle; and means for decreasing the resistance to the flow of said mercury, responsive to variations in the speed of the vehicle.

2. In a stabilizing device for vehicles; a first fluid actuated resilient means including an integral flexible casing forming a sealed chamber connected between the sprung and unsprung weight on one side of the vehicle; a second fluid actuated resilient means including an integral flexible casing forming a sealed chamber connected between the sprung and unsprung weight on the other side of the vehicle; control means for said resilient means including a first conduit means for a first fluid flow in communication with the interior of one of said sealed chambers; a second conduit means for a second fluid flow in communication with the interior of the other of said sealed chambers; a first electrically actuated valve means for controlling said first fluid flow; a second electrically actuated valve means for controlling said second fluid flow; and mercury switch means electrically connected to said valve means and including a first energized position wherein said first valve means is electrically energized, a second energized position wherein said second valve means is electrically energized and a neutral position wherein said two valve means are deenergized, said mercury switch means including a mercury supporting surface inclined relative to the horizontal for causing mercury to be shifted from one level to a higher level by an inertia force encountered by said vehicle; and means for decreasing the resistance to the flow of said mercury responsive to variations in the speed of the vehicle.

3. A stabilizing apparatus for a vehicle of the type which includes sprung and unsprung weights, a first fluid actuated resilient means including an integral flexible casing forming a sealed chamber between said weights on one side of said vehicle and a second fluid actuated resilient means including an integral flexible casing forming a sealed chamber between said weights on the other side of said vehicle; electrically actuated valve means for operating said resilient means; mercury switch means in circuit with said electrically actuated valve means and including a pivotally mounted inclined surface and a pair of contracts adapted to be engaged by mercury upon movement of said mercury along said inclined surface; and a sensitivity governor for varying the sensitivity of said mercury switch means, said sensitivity governor including means for automatically varying the angle of inclination of said inclined surface responsive to variations in the speed of said vehicle.

4. A stabilizing apparatus for a vehicle of the type which includes sprung and unsprung weights, a first fluid actuated resilient means including an integral flexible casing forming a sealed chamber between said weights on one side of said vehicle and a second fluid actuated resilient means including an integral flexible casing forming a sealed chamber between said weights on the other side of said vehicle; electrically actuated valve means including a neutral position, a right position wherein said right fluid actuating means is actuated, and a left position wherein said left fluid actuating means is actuated; switch means in circuit with said electrically actuated valve means, said switch means including a first pair of contacts for moving said valve from said neutral position to said first position and a second pair of contacts for varying said valve means from said neutral position to said second position, said switch means including a pivotally mounted inclined surface and a pair of contacts adapted to be engaged by mercury upon movement of said mercury along said inclined surface; and a sensitivity governor for varying the sensitivity of said switch means, said sensitivity governor including means for automatically varying the angle of inclination of said inclined surface responsive to variations in the speed of said vehicle.

5. A stabilizing apparatus for a vehicle of the type which includes sprung and unsprung weights, a first fluid actuated resilient means including an integral flexible casing forming a sealed chamber between said weights on one side of said vehicle and a second fluid actuated resilient means including an integral flexible casing forming a sealed chamber between said weights on the other side of said vehicle; electrically actuated valve means for operating said fluid actuated means; mercury switch means in circuit with said electrically actuated valve means, said mercury switch means including a mercury supporting surface inclined relative to the horizontal for causing mercury to be shifted from one level to a higher level by an inertia force encountered by said vehicle; and means for decreasing the resistance to the flow of said mercury, said means being operatively responsive to a variation in the speed of said vehicle.

References Cited by the Examiner

UNITED STATES PATENTS 2,790,650  4/1957  Boschi.
2,960,349  11/1960  Vogel.

FOREIGN PATENTS 670,361  4/1952  Great Britain.

BENJAMIN HERSH, *Primary Examiner.*

LEO FRIAGLIA, A. HARRY LEVY, *Examiners.*

W. A. MARCONTELL, *Assistant Examiner.*